Oct. 8, 1957     W. D. CHAMPION, SR     2,808,732
GEARING

Original Filed Sept. 5, 1944     3 Sheets-Sheet 1

Inventor
William D. Champion Sr.
By J. Preston Swecker
his Attorney

Oct. 8, 1957  W. D. CHAMPION, SR  2,808,732
GEARING
Original Filed Sept. 5, 1944  3 Sheets-Sheet 2

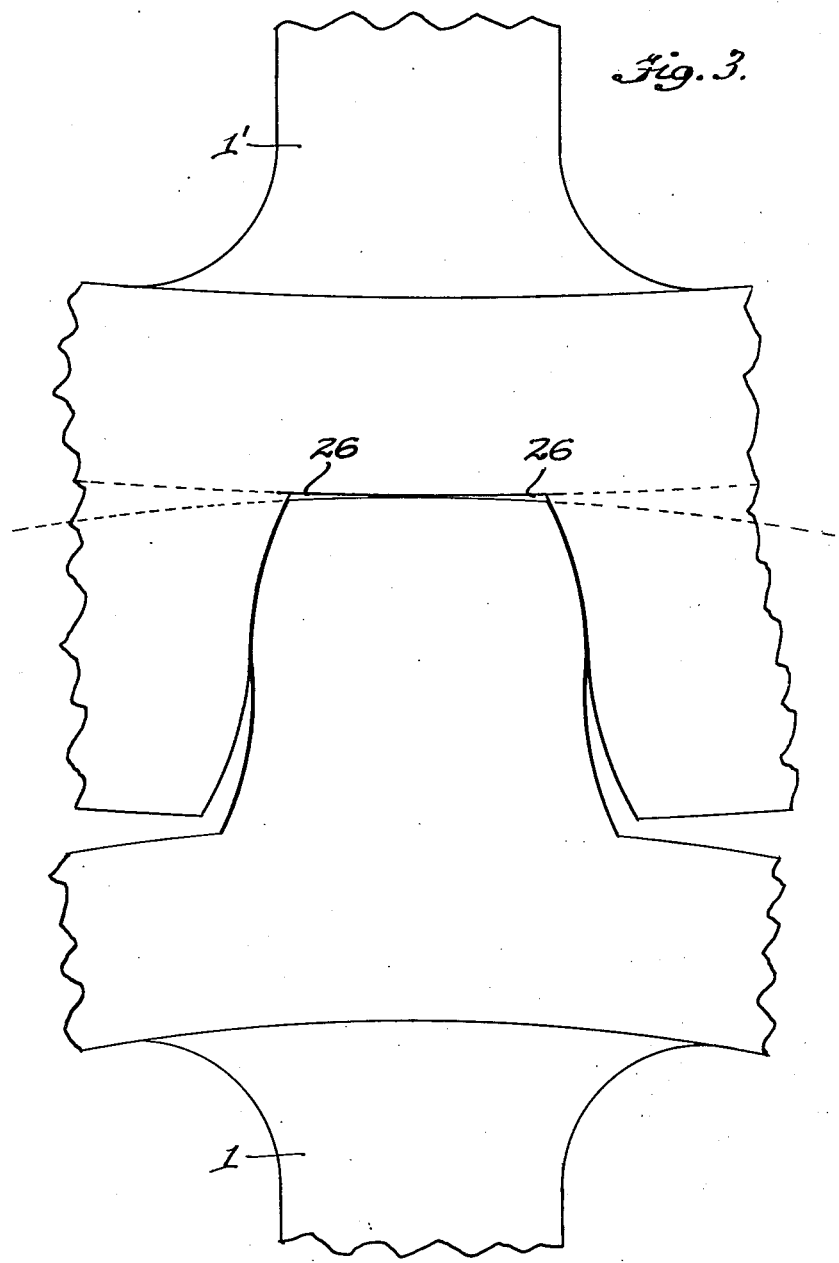

United States Patent Office 2,808,732
Patented Oct. 8, 1957

2,808,732
GEARING

Wilburn D. Champion, Sr., Cleveland, Ohio

Continuation of application Serial No. 552,731, September 5, 1944. This application November 10, 1952, Serial No. 319,656

8 Claims. (Cl. 74—462)

This application is a continuation of my application, filed September 5, 1944, Serial No. 552,731.

This invention relates to an improvement in gearing and particularly to a method of forming gears of the spur, bevel, herringbone, spiral, hypoid, helical and worm types, and to the construction of such gears.

Most gears as used heretofore have been objectionable because of the small contacting areas of the teeth, the noise resulting from the engagement of certain types of the teeth as the gears rotate and the difficulty of lubricating the gears adequately in service. Furthermore, such gears are inefficient in operation due to the difficulty of obtaining and enduring great power therewith satisfactorily, and the fact that ordinarily only one tooth of each spur gear is in engagement with one tooth of the opposite gear at any one time. They have also required an excessive pressure angle, torque resistance, and ingress percentage contact, caused by the shape and contact of the teeth of such gears.

Efforts have been made to obviate these objections, particularly by employing spiral, herringbone, helical or worm gearing, instead of spur gearing, wherever the same may be used, but the cost of manufacturing such spiral, herringbone, helical or worm gearing makes it almost prohibitive in many instances.

The object of this invention is to improve the design and construction of gears to provide an efficient and noiseless operation and which can be constructed at no greater cost than that of ordinary spur or bevel gears and generally in the same manner of spur or bevel gears. At the same time the construction of the gears, according to this invention, does not require great skill; and due to its simplicity of design, these may be made at much less cost and with less material than any other comparable gearing used heretofore.

This object is accomplished by the lay-out of the gear teeth as hereinafter described which provides for augmented surface contact of the teeth of intermeshing gears throughout the adjacent portions thereof so that at least three teeth of one gear are in bearing engagement with two or more teeth of the opposite gear at any one time, and the teeth of the one gear embracing a tooth of the opposite gear bear against opposite sides thereof over surfaces of said teeth by means of adequate lubrication and tolerance as per material employed, which provide for greater efficiency and noiseless operation due to the rolling motion on lubricant that occurs between the teeth in the rotation of the gears. Furthermore, material may be added to the base of the female portion of the teeth to increase greatly the strength of the coacting male portion of the teeth.

I have illustrated examples of my invention in the accompanying drawings in which:

Fig. 3 is an enlarged detail side elevation showing intermeshing teeth.

Although this invention is adapted for use in the construction of gears of any relative sizes and types, it is appreciated that the pitch of teeth should be corelated to the relative sizes and types of the gears for the purpose intended, and the number of teeth, therefore, depends also on these characteristics. In designing gears according to this invention, standard conditions of pitch and number of teeth are taken into consideration according to the desired diameter of the gears to be made. When these conditions are known, of the diameter of the gears and the number and type (long or short) of teeth desired in the respective gears, the lay-out of gearing may then proceed according to the method hereinafter set forth.

Figure 1:
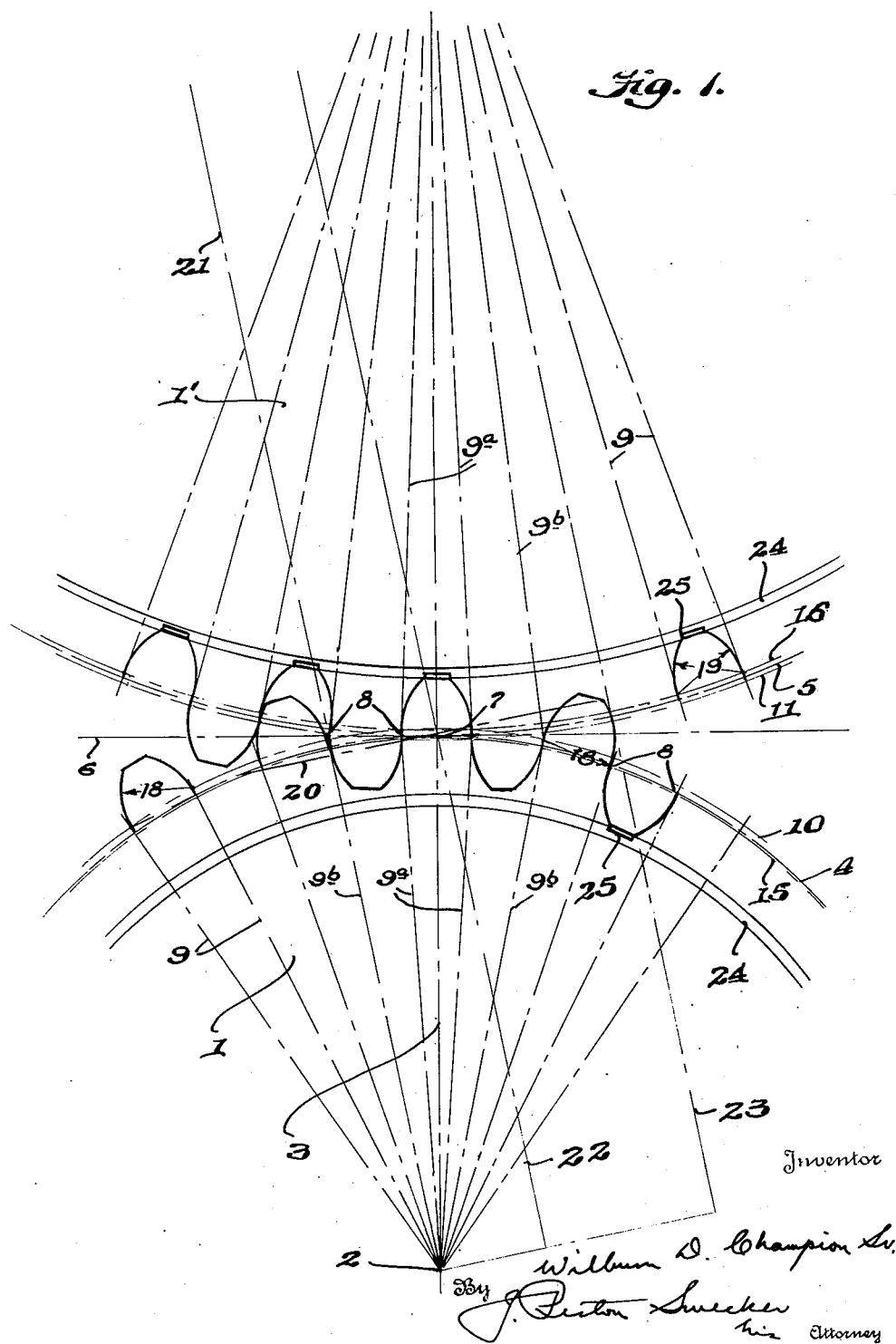
Fig. 1 is a diagrammatic lay-out showing the tooth design of a pair of coacting gears of different diameters.

In designing such gearing, the process is the same generally without regard to the relative diameters of the intermeshing gears, one size of which is shown in Fig. 1, for purpose of illustration, for a driving gear 1 of nine inch diameter, having fifty-four teeth, and a driven gear 1', of fifteen inch diameter, having ninety teeth, six pitch. With the known factors of gear diameter and pitch and length of the teeth determined, by the usual gear designing engineering practice, the designer would then proceed as follows:

The gear centers are first determined, as designated at 2, on a center line 3 drawn through said centers for the respective driving and driven gears of the pair.

The pitch circles of the respective gears 1 and 1' are designated at 4 and 5, respectively, tangent to each other at a point 7, with the centers of said pitch circles at the center points 2 of the respective gears, as will be evident. Then a bisect line 6 is drawn tangent to the pitch circles 4 and 5 through the intersecting point 7 thereof with the center line 3.

Thereafter, the width of each tooth is laid off along the pitch circles 4 and 5, in a desired relation with the center line 3. In Fig. 1, the center line 3 is midway of a tooth, when providing an even number of teeth for each gear, but these may be laid out at one side, as shown in Fig. 3, for an odd number of teeth, or any other desired relation thereto. The pitch of additional teeth are laid off along the respective pitch circles, as indicated by the points 8. A sufficient number of teeth, usually three or four, may be laid out on each side of the center line for convenience of design, although ordinarily this would involve the laying-out of each gear completely on a single sheet to avoid design or construction of the gears in segments, even though the drawings illustrate only a segment of each gear. It is obvious that in similar manner the remainder of each gear may be formed in the one lay-out, by completing the respective circles and shaping the teeth on the gears as described.

After thus laying off the points representing the sides of the gear teeth, segment lines 9 are drawn from the centers 2 of the gears through the points 8, and those segment lines which are designated 9a and 9b adjacent the center line 3 should be continued to intersect the bisect line 6 for a purpose hereinafter described.

Figure 2:
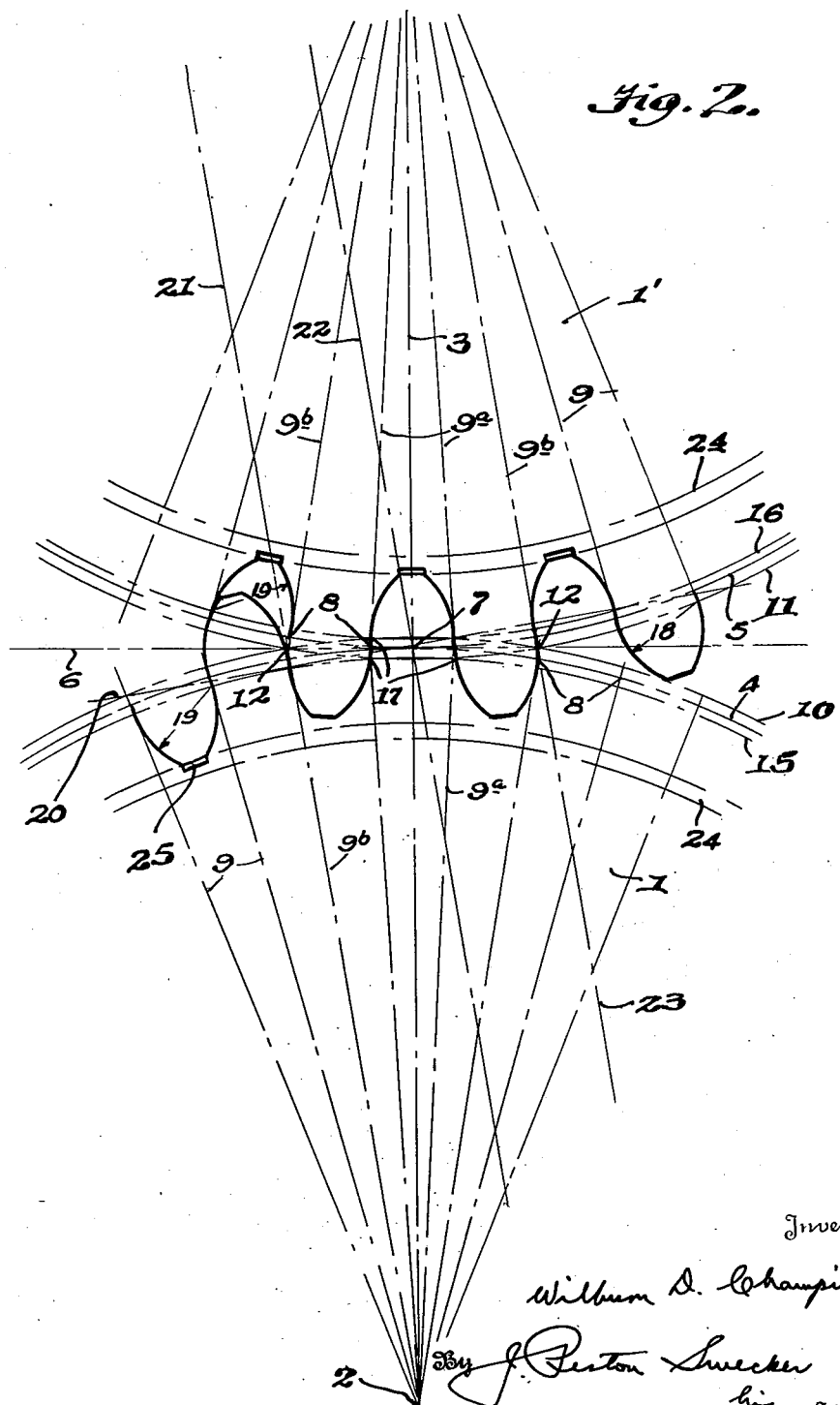
Fig. 2 is a similar view for gears of the same diameter.

These segment lines 9, 9a and 9b extend through the points 8 that determine the opposite sides of the teeth when the teeth are laid out, so that the center point 7 is midway of a tooth, as shown in Figs. 1 and 2. However, when the teeth are stepped off from the center point 7, so that said point is at the side edge of a tooth, the lines 9a and 9b should be drawn through the centers of the respective teeth, as shown in Fig. 3.

Then, the marginal circles, arcs or lines 10 and 11 are drawn for the respective gears 1 and 1', with the centers thereof at the center points of the respective gears 2. The term "marginal circles" is applied arbitrarily to the arcs or lines 10 and 11 which are used for forming the tooth surfaces as hereinafter described.

Where the gears are of the same diameter, as shown in Fig. 2, these marginal circles 10 and 11 are determined by points 12, where the segment lines 9b next adjacent the center line 3 intersect the bisect line 6 on each opposite side of the center line 3. If the gears are of different diameters, the marginal line 10 of the driving gear should be determined first, through the point of intersection of the segment lines 9b with each other, which will not intersect on the bisect line 6, but on the side of the bisect line toward the smaller gear. Then the marginal line 10 for the driving gear may be drawn through this point of intersection. Then the marginal line of the driven gear can be determined by a point spaced from the point of intersection of the lines 9b, a distance equal to the spacing of that point of intersection from the pitch circle of the driving gear. In other words, the marginal circle 11 of the driven gear should be spaced from the point of intersection of the lines 9 a distance equal to the spacing of said point of intersection from the pitch circle of the driving gear.

Where tolerance is to be allowed between the respective gears, according to the purpose intended, one-half of the tolerance should be deducted from the radius of each coacting gear. However, the tolerance should be kept as low as possible according to the purpose intended.

Then base circles 15 and 16 are drawn through the points 17 where the circles 11 and 10, respectively, intersect the segment lines 9a adjacent the center line 3. These are the base circles that will be used for laying-out the female portions of the respective teeth which may be formed according to the centers thus determined.

In laying out the male portions of the teeth, the marginal circles 10 and 11 are used as centers as indicated by the arrows 18 at the right and left in Fig. 1. The needle of the compass is placed on the line 11 (Fig. 1) where it is intersected by the segment line 9. The pencil point is placed on the pitch circle 5 at the intersection of said pitch circle by the next adjacent segment line 9. The radius 18 of the arc is the distance from a point of intersection of one line 9 with the circle 11 to the point of intersection by the next adjacent line 9 with the pitch circle 5.

The arc is then drawn to form one side of the male tooth portion of the driven gear. This is continued for each male tooth portion of the driven gear. Then, in like manner, the marginal circle 10 is used to form the male teeth of the drive gear. This will form one-half of each side of each tooth, the male portion thereof, as a convex surface which may extend either to a point at the center of the end of the tooth or the ends of the teeth may be cut off, as shown in Figs. 1 and 2.

Then the female portions of the respective teeth are formed by arcs, indicated at 19 in Fig. 1, from centers on the base circles 15 and 16, or a radius extending therefrom to the point of intersection of the pitch circle with the next adjacent segment line. In this instance, the compass needle is placed on the line 15, where it is intersected by the line 9, and with the pencil point on the pitch circle 4, the arc is drawn for one side of each tooth. This is continued until all of the tooth portions are formed. The female portions of the driven gear are formed in like manner using the base circle 16, where it is intersected by the lines 9, as centers, and with the pencil point on the pitch circle 5 at the point of intersection thereof with the lines 9.

It is found that by thus using the lines 15 and 16 for the centers of these arcs, that a smooth fit of the intermeshing teeth is obtained, producing rolling action on lubricant therebetween in the rotation of the gears. At the same time, when the pitch of the teeth is determined according to known standards of gear size, which are utilized according to this invention, the teeth of intermeshing gears interfit substantially as indicated in the drawings producing the desired action.

While the teeth may be formed pointed, as shown in Fig. 3, either for an even number or an odd number of teeth, the teeth may be formed blunt, if desired, as shown in Figs. 1 and 2, according to the desired length of the teeth. Where pointed teeth are used, the length thereof will be determined by the radius lines 18 to the sides thereof since the side margins of the teeth will intersect. Where the teeth are to be formed blunt, the length of the teeth can be determined by engineering practice, according to known standards for speed, power, torque, etc.

In this instance, the length of the teeth of the driving gear is determined and a circle drawn of the required radius intersecting the sides of the male portions of the teeth, which should be located at a point sufficiently spaced toward the center of the driven gear outside the pitch circle of the drive gear to give substantially rolling action.

Then the depth of the female portions of the teeth of the driven gear should be the same distance from the pitch circle 5 of the driven gear as the length of the male portions of the teeth of the drive gear from the pitch circle 4 of the drive gear. This will determine the depth of the female portions of the driven gear. For the male portions of the teeth of the driven gear, the end face of each should be extended in a concentric direction equal to the width of face of the female base portion of the drive gear.

Then the depth of the female portion of the driven gear should be equal to the length of the male portion of the drive gear outwardly of the pitch circle 4, being spaced inwardly on the driven gear from the pitch circle 5 thereof. The base line of the female portion of each gear should be drawn as a straight line in a circumferential direction.

If desired, the gears 1 and 1' may be built out at the base of the teeth by the provision of integral flanges 24 thereon to give added strength at these points, just inwardly of the ends of the female portions of the teeth.

When the teeth have blunt ends, the end of each tooth usually is formed concentric with the axis of the gear and coincident with the addendum circle. The bottom surface of the female portion is formed on an arc concentric with the axis of the gear. This gives sufficient space, indicated at 26 in Fig. 3, for relative motion of the teeth during rotation of the gear.

It will be evident that in laying-out complete gears, the width of the teeth will be laid out along the pitch circles 4 and 5 throughout the circumference thereof, and the lines 9 drawn at these points if desired, or the points otherwise indicated where these lines would intersect the respective circles. Then the tooth surfaces would be laid out throughout the circumference of the respective gears, utilizing the points thus designated on the respective circles 10 and 11 for the male tooth surfaces, and, 15 and 16 for the female tooth surfaces. This will provide the desired shape of teeth throughout the peripheries of the gears, as indicated in the drawings.

From this lay-out of tooth surfaces, it will be evident that the gears may be formed according to any well-known or standard method, by reproducing these shapes in metal or other material by hobbing or otherwise.

This produces gears whose operation is smooth and continuous due to the large surface area in contact between the respective teeth of the intermeshing gears, not only reducing the noise attendant to their operation, but also obtaining more efficient application of power from one gear to the other. The lubricant used for the gears is retained to a large extent as the load is transferred from tooth to tooth. This action prevents vibration or chatter, and also lost motion and backlash, and can be employed in any desired ratio of gearing, as desired. At the same time, the pitch of the teeth can be somewhat less than would be used normally in ordinary gearing as made heretofore handling similar loads.

The main characteristic of this gear's operating action is as follows: First, from the first point of contact (or ingress) to within ½ tooth chord of the pitch point, the arc of the flank of the driving side of the contacting tooth of the driving gear is congruous to the arc of the face of the driving side of the contacting tooth of the driven gear. As shown in Figs. 1, 2 and 3, the contacting surfaces on both sides of the intermeshing teeth of the driving and driven gears lying in a plane through the center axes of the gears extend continuously from points at the ends of the center tooth to points along the surfaces thereof on the opposite side of the pitch circle, thus producing materially increased bearing areas, as compared with gear teeth used heretofore, and affording a larger area for lubrication. This holds true regardless of the direction of rotation (clockwise or counter-clockwise) of the two coacting gears. Secondly, from within ½ tooth chord past the pitch point in the direction of rotation to the last point of contact (or digress) the face of the driving side of the contacting tooth of the driving gear is congruous to the flank of the driving side of the contacting tooth of the driven gear. This holds true regardless of the direction of rotation (clockwise or counter-clockwise) of the coacting gears.

The pressure angle line is shown at 20, normal to the percentage lines 21, 22 and 23. The percentage line 21 is the ingress percentage line, while the line 23 is the digress percentage line, the line 22 extending parallel therewith through the center point 7. The terms "ingress percentage line" and "digress percentage line" are arbitrary terms used to indicate the line on which the teeth move into and out of mesh with each other. The surface between the lines 21 and 22 is the ingress surface toward the center of contact and should be preferably less than one-half of the tooth surface in contact. The digress contact surface is the portion thereof between the lines 22 and 23. The ingress percentage is less than the digress percentage, being thirty-seven percent of ingress and sixty-three percent digress in the example given. This provides for less friction on the ingress than on the digress, the friction of the latter counteracting that of the former, and not only reduces resistance to torque but also reduces the excessive pressure to the axes and increases the life and service of the bearings.

These lines are established at a pressure angle of eleven and one-fourth degrees to the center line 3, as distinguished from the standard practice heretofore in involute gearing, of fourteen and one-half degrees. Thus the pressure angle is reduced which is very advantageous to torque axis, life and service of the gear.

The width and contact of the teeth determine the pressure angle employed, but due to the increased amount of surface contact between the teeth according to this invention, the pressure angle may be materially reduced which is greatly advantageous in the functioning of the gearing. The pressure angle of the drive gear is the same as for the driven gear inasmuch as the teeth of both are of the same width, regardless of the diameter or ratio or the type of gearing.

This construction eliminates undue separating force between the gears that has been present heretofore in involute gearing. Furthermore, most involute gear teeth engage along a surface, the major portion of which is outwardly of the pitch line of the driven gear which has a tendency to exert a separating force on the gears, but the construction of this invention provides for engagement of the driven surfaces, the major portion of which is outwardly of the pitch line of the driven gear, which thereby also tends to reduce the separating force between the gears.

It will be evident that the design of gearing herein set forth enables the gears to be constructed according to known or desired methods, after the lay-out is determined, at no greater cost than ordinary spur, bevel, or worm gears, and yet producing much more efficient operation, greater power and strength, and less noise than with spur or bevel gearing. These factors are equal to or better than the usual worm gearing and yet the cost of production is only a fraction of the cost of spiral and herringbone gears, and greatly improved results over these several types of gearing, including worm gearing. At the same time, when the gearing is formed accurately as is possible with the process herein described, this will provide the most accurate system of gearing known to me, and much improved over gearing used heretofore.

While the invention has been illustrated and described in certain embodiments, it is recognized that variations and changes can be made therein without departing from the invention as set forth in the claims.

I claim:

1. A gear having teeth formed of male and female tooth portions formed on arcs inscribed from centers on marginal arcs for the male tooth portions and on base arcs for the female tooth portions, which marginal and base arcs are located on opposite sides of a pitch circle along which the pitch of the teeth is laid out by segment lines extending from the center of the respective gears and intersecting the respective pitch circles thereof, the length of the radius of each of said arcs of the tooth portions being approximately equal to the distance from the intersection of one segment line with the marginal arc to the next adjacent segment line at the point of intersection thereof with the pitch arc, which segment lines extend from the center of the gear to the opposite sides of the tooth on the pitch arc and intersect the respective marginal and base arcs.

2. A gear having teeth formed of male and female tooth portions extending respectively on opposite sides of a pitch circle, which tooth portions are formed on arcs inscribed from centers on a marginal circle for the male tooth portions and on a base circle for the female tooth portions, which marginal and base circles are located on opposite sides of the pitch circle along which the pitch of the teeth is laid out by segment lines extending from the center of the respective gears and intersecting the respective pitch circles thereof, the length of radius of each of said arcs of the tooth portions being approximately equal to the distance from the intersection of one segment line with the marginal circle to the next adjacent segment line at the point of intersection thereof with the pitch circle, which segment lines extend from the center of the gear to the opposite sides of the tooth on the pitch circle and intersect the respective marginal and base circles.

3. A pair of intermeshing gears each formed of male and female tooth portions respectively on opposite sides of tangent pitch circles, which teeth are located along the pitch circles by segment lines extending from the centers of the respective gears and intersecting the respective pitch circles, the male and female tooth portions being formed on arcs inscribed from centers on marginal arcs for the male tooth portions and on base arcs for the female tooth portions, which marginal and base arcs are located on opposite sides of the respective pitch circles, the length of the radius of each of said arcs of the tooth portions being approximately equal to the distance from the point of intersection of one segment line with the pitch arc to the point at the intersection of the adjacent segment line with the respective marginal and base circles and with the center of said arc on the respective marginal and base circles.

4. A pair of intermeshing gears each formed of addendum and dedendum tooth portions respectively on opposite sides of tangent pitch circles, each of the teeth on each gear having opposite convex faces outwardly of the pitch circle thereof and opposite concave faces inwardly of the pitch circle thereof, said tooth surfaces of the pair of gears having congruous coacting faces shaped in opposed relation in surface contact between the ingress teeth thereof from the point of engagement thereof to the center alignment of the teeth in a plane through both gear axes and between the opposed congruous faces of the digress teeth from said center alignment to the point of disengagement of the digress teeth.

5. A pair of intermeshing gears each formed of addendum and dedendum tooth portions respectively on opposite sides of tangent pitch circles, each of the teeth on each gear having opposite convex faces outwardly of the pitch circle thereof and opposite concave faces inwardly of the pitch circle thereof, the shape of the concave face of each tooth at the ingress side thereof being congruous to, and continuously in surface-contact with, the opposed convex face of the adjacent tooth from the point of engagement thereof to the center alignment of the teeth of the pair of gears in a plane through both gear axes, and the shape of the convex face of each tooth at the digress side thereof being congruous to, and continuously in surface contact with, the opposed concave face of the adjacent tooth from said center alignment to the point of disengagement of the teeth.

6. A pair of intermeshing gears each formed of addendum and dedendum tooth portions respectively on opposite sides of tangent pitch circles, each of the teeth on each gear having opposite convex faces outwardly of the pitch circle thereof and opposite concave faces inwardly of the pitch circle thereof, said face of the driving side of each contacting tooth of the driving gear being curved congruous to the abutting face of the driving side of the driven gear from the first point of contact to within one-half tooth chord of the pitch point, and the face of the driving side of the contacting tooth of the driving gear being curved congruous to the driving side of the contacting tooth of the driven gear from within one-half tooth chord past the pitch point in the direction of rotation to the last point of contact therewith.

7. A pair of intermeshing gears each formed of addendum and dedendum tooth portions respectively on opposite sides of tangent pitch circles, each of the teeth on each gear having opposite convex faces outwardly of the pitch circle thereof and opposite concave faces inwardly of the pitch circle thereof, said tooth surfaces of the pair of gears having congruous coacting faces shaped in opposed relation in surface contact between the ingress teeth thereof from the point of engagement thereof to the center alignment of the teeth in a plane through both gear axes and between the opposed congruous faces of the digress teeth from said center alignment to the point of disengagement of the digress teeth, the surface contact of a tooth of one gear in said plane through both gear axes extending continuously from the end of said tooth along the surfaces thereof to points on the opposite sides of the pitch circle thereof.

8. A pair of intermeshing gears each formed of addendum and dedendum tooth portions respectively on opposite sides of tangent pitch circles, each of the teeth on each gear having opposite convex faces outwardly of the pitch circle thereof and opposite concave faces inwardly of the pitch circle thereof, the addendum tooth surfaces of each gear being curved complementary to the dedendum tooth surfaces of the coacting gear continuously from the point of engagement of the ingress teeth thereof to the center alignment of the teeth in a plane through both gear axes and outwardly from said center alignment to the point of disengagement of the digress teeth, substantially in surface contact.

References Cited in the file of this patent

UNITED STATES PATENTS

| | | |
|---|---|---|
| 83,469 | Crandall | Oct. 27, 1868 |
| 274,861 | Vivarttas | May 27, 1883 |
| 1,833,159 | Garnett | Nov. 24, 1931 |